US008838646B2

(12) United States Patent
Kuehr-McLaren et al.

(10) Patent No.: US 8,838,646 B2
(45) Date of Patent: Sep. 16, 2014

(54) USING SOCIAL NETWORKING THRESHOLDS IN ACCESS CONTROL DECISIONS

(75) Inventors: David Gerard Kuehr-McLaren, Apex, NC (US); Ranjan Kumar, Durham, NC (US); Kwabena Mireku, Durham, NC (US); Govindaraj Sampathkumar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1658 days.

(21) Appl. No.: 12/042,945

(22) Filed: Mar. 5, 2008

(65) Prior Publication Data

US 2009/0228486 A1    Sep. 10, 2009

(51) Int. Cl.
*G06F 7/00* (2006.01)
*G06Q 10/10* (2012.01)
*G06F 17/30* (2006.01)

(52) U.S. Cl.
CPC ............ *G06F 17/3089* (2013.01); *G06Q 10/10* (2013.01)
USPC ............ 707/783; 707/781; 707/784; 707/785

(58) Field of Classification Search
USPC .................................................. 707/783–784
See application file for complete search history.

(56) References Cited

U.S. PATENT DOCUMENTS

| 6,092,201 | A | 7/2000 | Turnbull et al. ............... 713/201 |
| 6,208,984 | B1 * | 3/2001 | Rosenthal ...................... 707/783 |
| 2005/0198031 | A1 * | 9/2005 | Pezaris et al. ...................... 707/9 |
| 2006/0215690 | A1 * | 9/2006 | Wilson et al. .................. 370/465 |
| 2008/0250471 | A1 * | 10/2008 | Cooley et al. ...................... 726/1 |
| 2008/0256602 | A1 * | 10/2008 | Pagan ............................... 726/3 |
| 2009/0171964 | A1 * | 7/2009 | Eberstadt et al. .................. 707/9 |
| 2009/0210423 | A1 * | 8/2009 | Valz ................................... 707/9 |

* cited by examiner

*Primary Examiner* — Robert Beausoliel, Jr.
*Assistant Examiner* — Susan F Rayyan
(74) *Attorney, Agent, or Firm* — Cuenot, Forsythe & Kim, LLC

(57) ABSTRACT

A method, program product and apparatus for controlling access to profile information, multi-media resources or social network functions of a first user by a second user not listed on a friend or group listing of the first user. An application retrieves a threshold criteria for access control and social network statistics in response to an attempted access by an entity without an appropriate privilege. The application compares the statistics to the threshold. Then, if the statistics meet the threshold criteria, the application allows access.

18 Claims, 4 Drawing Sheets

| 302 304 300 | | |
|---|---|---|
| AL'S FRIENDS | | _120_ |
| BOB | 285 | KNOWN PERSONALLY |
| CARL | 180 | SOCCER TEAM |
| DAVE | 37 | SOCCER TEAM |
| ED | 100 | FAMILY |
| FRANK | 50 | |

| BOB'S FRIENDS | | _310_ |
|---|---|---|
| AL | 285 | KNOWN PERSONALLY |
| CARL | 30 | |
| DAVE | 30 | |
| KEVIN | 3 | |
| LARRY | 3 | FAMILY |

| CARL'S FRIENDS | | _320_ |
|---|---|---|
| AL | 180 | SOCCER TEAM |
| BOB | 30 | |
| DAVE | 20 | SOCCER TEAM |

| DAVE'S FRIENDS | | _330_ |
|---|---|---|
| AL | 37 | SOCCER TEAM |
| BOB | 30 | |
| CARL | 20 | SOCCER TEAM |
| KEVIN | 2 | |

| ED'S FRIENDS | | _340_ |
|---|---|---|
| AL | 100 | FAMILY |
| BOB | 2 | |
| CARL | 3 | |
| KEVIN | 5 | |
| LARRY | 3 | KNOWN PERSONALLY |

| FRANK'S FRIENDS | | _350_ |
|---|---|---|
| AL | 50 | |
| ED | 5 | |
| KEVIN | 1 | |

FIG. 3

USING SOCIAL NETWORKING THRESHOLDS IN ACCESS CONTROL DECISIONS

FIELD OF THE INVENTION

The invention relates to the field of Internet communications and more particularly to a method apparatus and program product for using social networking thresholds in access control decisions.

BACKGROUND

Social networks are widely used for sharing content such as information, ideas, photographs, and the like. It is desirable for many social network users to control access to content owned by that user and available through a social network. In social networks such as Facebook, Yahoo 360, My Space and the like, there are various roles that the user can use to grant permissions and allow access to the resources and information owned by the individual. Examples of these roles include: Public (Anyone can access), Private (Only the owner can access), My Friends (Only users accepted into the owner's friends list can access), and Groups (a subset of My Friends, such as Work, Family, Soccer Team, etc can access). The membership to these roles is managed by the user by explicitly adding other users to a list associated with a particular role. Using explicit membership lists, however, limit the discovery and expansion of the social network.

Different access levels may be assigned for different roles. For example, an owner of a blog set up to exchange information and pictures for a soccer team may allow the Public to view a blog entry, such as times and locations of future games and discussions about games. The owner, however, may only allow those users accepted as mutual friends to post comments to the entry, and only allow those friends who are tagged as members of the group "Soccer Team" to post pictures. The roles of Public, Private, My Friends, and Groups such as "Soccer Team" are all forms of traditional groups used in resource control. One drawback to using definitive group membership for access to social networking resources is that it retards one of the major benefits of social networking, namely discovering new people and adding them as participants in social interaction. In order to allow a new person to participate using resources that the owner desires to exercise control over at more than a Public setting, the owner must explicitly discover the new person and add that person to an explicit group.

One approach that addresses the explicit membership issue is the "Friends of Friends" role offered by one social network provider. By designating the "Friends of Friends" role, permission (and access) can be granted to any user that has been added as a friend to someone who is explicitly in the user's "My Friends" list. This second degree of separation approach is very wide open. A mistake of one user to add an undesirable user such as a spammer or troll to his/her friends list exposes anyone who has chosen the "Friends of Friends" role and has the user explicitly listed as a friend.

SUMMARY

A method, program product and apparatus for controlling access to profile information, multi-media resources or social network functions of a first user by a second user not listed on a friend or group listing of the first user. An application retrieves a threshold criteria for access control and social network statistics in response to an attempted access by an entity without an appropriate privilege. The application compares the statistics to the threshold. Then, if the statistics meet the threshold criteria, the application allows access. In an exemplary embodiment, meeting the threshold comprises the social network statistics having the features of the threshold. The social network statistics may comprise one or more of: number of users listed as friends for said first user who list said second user as a friend, length of time that users listed as friends for said first user have listed said second user as a friend, percentage of users listed as friends for said first user who list said second user as a friend, and groups of which said second user is a member.

In an alternative embodiment, the threshold is met by the social network statistics not having the specified combination of statistics. Thus, likely spammers can be blocked by a statistical profile of a likely spammer. For example, a new member of a social network that is listed on a high percentage of friends list will likely be a spammer.

BRIEF DESCRIPTION OF THE DRAWINGS

The features and advantages of the invention will be more clearly understood from the following detailed description of the preferred embodiments when read in connection with the accompanying drawing. Included in the drawing are the following figures:

FIG. 3 is a representation of exemplary friends lists in a social network according to an exemplary embodiment of the present invention;

DETAILED DESCRIPTION

Figure 1:
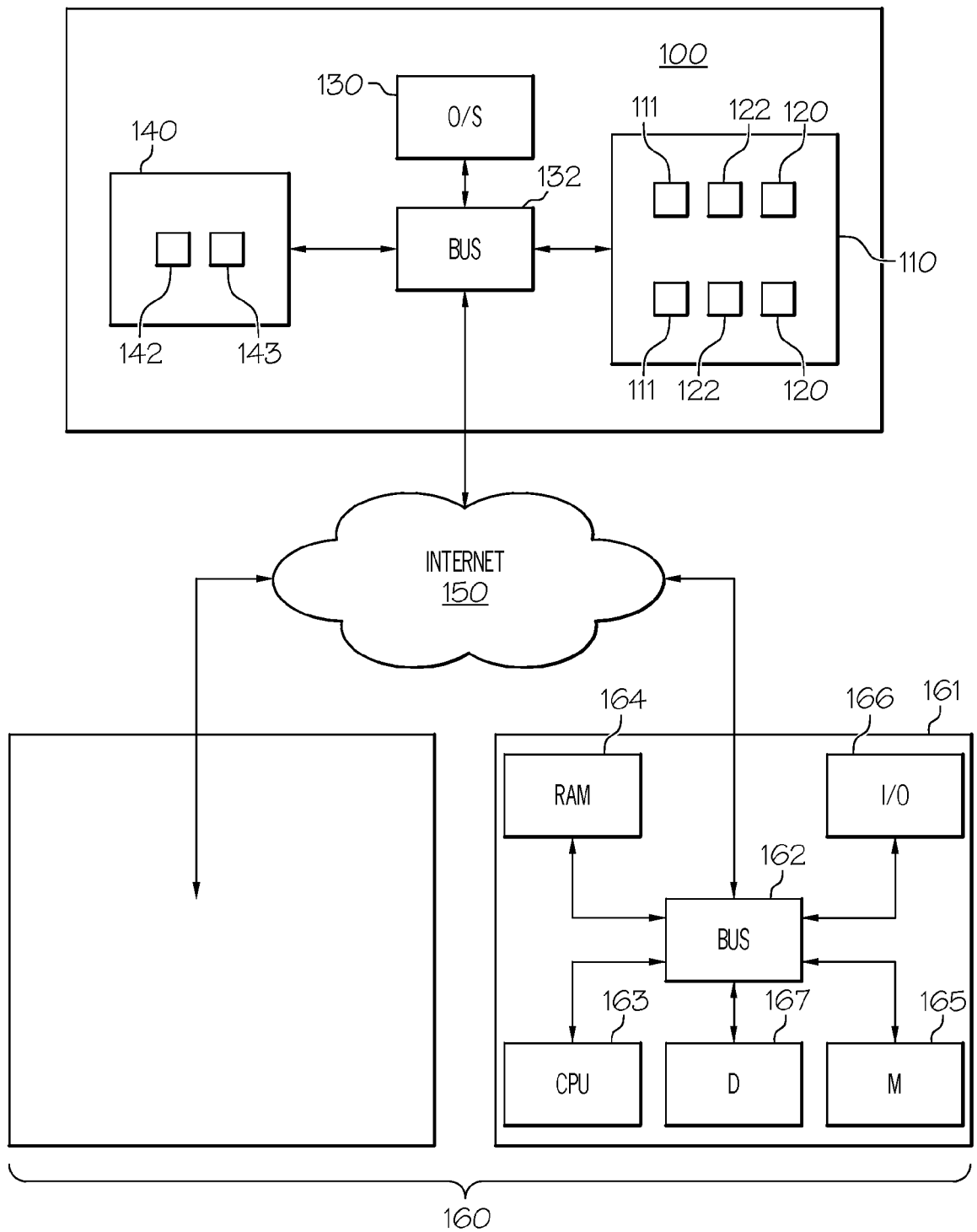
FIG. 1 is a block diagram of an apparatus for communicating through the internet using social networking thresholds in access control decisions according to an exemplary embodiment of the present invention.

The present invention provides a method, apparatus and program product for using social networking thresholds in access control decisions.

In an exemplary embodiment of the invention, an apparatus for using social networking thresholds in access control decisions comprises a social networking server 100. The server 100 is connected through a network 150 to a plurality of networked devices 160. The networked devices may comprise personal computers (PCs), personal digital assistants (PDAs), and the like. In one exemplary embodiment, a PC 161 is connected to the server 100. The PC comprises a bus 162 interconnected with the network 150 and also interconnected with a processing unit (CPU) 163, a random access memory (RAM) 164, a memory 165, an input/output device (such as a mouse, keyboard, printer, etc) 166, and a display 167.

In an exemplary embodiment, the server 100 has a memory 110 with code stored thereon comprising social networking information 111 such as a social networking page, personal information, contact information, multi-media resources, and the like. The memory 110 may be an internal memory device such as a hard drive or the like. Alternatively, the memory may be an external device interconnected to the server 100. A list of friends 120 may be stored on the memory 110 within the social networking information 111 or may be stored separately in memory 110, or may be stored in a user computer 161.

The server 100 also has an operating system 130 for executing social networking programs and operations. In an exemplary embodiment, the operating system 130 is connected to the memory 110 through a bus 132. In an exemplary embodiment, program code 142 is provided that, when executed by the operating 130 performs social networking functions interactively with one or more users. These functions may include creating a discussion topic, responding to a discussion topic, posting pictures, sharing information, and other social networking functions. The program code 142 may be provided in a separate memory 140 or may be stored in the same memory as the social networking information.

A social network user may build one or more lists of friends 120. This list 120 may comprise one or more roles 121 associated with various friends. For example, a user may add to his/her list 121 friends who are relatives 121A, friends who are known personally 121B, friends who are members of the user's soccer team 121C, friends who are classmates 121D, and the like. The list 121 may also include the date when each friend was added.

The networking information 111 may be associated with the various roles 121. For example, a social network user may associate his/her personal information with the role "known personally" so that only those friends that are listed as personally known to the user may access the personal information. In an exemplary embodiment, the roles may be selected when the content is posted, such as through a menu function or a dialog box.

In an exemplary embodiment, the program code 142 comprises a threshold criteria 122. The threshold criteria 122 is a statistical threshold used to grant access to a privileged content 111 or function. For example, a social network user may allow access to another user who is not on the content owner's friends list 120 if the other user is personally known by or a family member of a specified number of users who are on the content owner's friends list 120. The specified number may be one or any number greater than one and may be a default value or a value set by the content owner. Alternatively, the threshold criteria may allow access if the other user attempting to access a privileged content 111 or a privileged function may require that the user seeking access is listed as a friend by a specified number of users currently on the content owner's friends list 120 or a specified percentage of the users currently listed on the content owner's friends list 120. Moreover, the threshold criteria may require that the user seeking access be listed as a friend on the specified number of friends on the content owner's friends list 120 for a specified period of time.

The networking functions may also be associated with specific roles. For example, a user may create information about the user's soccer team and post it to the user's social networking page. The user may then associate this content with the role "soccer team" for all functions. Thus, this content about the soccer team is only accessible to other users who are listed as friends with the specific role of "soccer team". Alternatively, the user may post a discussion topic about the user's soccer team and associate the role "friends" with the function of viewing the content, associate the roles of "known personally" and "family" with the function of posting replies to the topic, and associate the role of "soccer team" with the function of posting pictures. Thus, all friends would be able to view the topic, only friends known personally and family would be able to post replies, and only friends listed as members of the soccer team would be able to post pictures.

Figure 2:
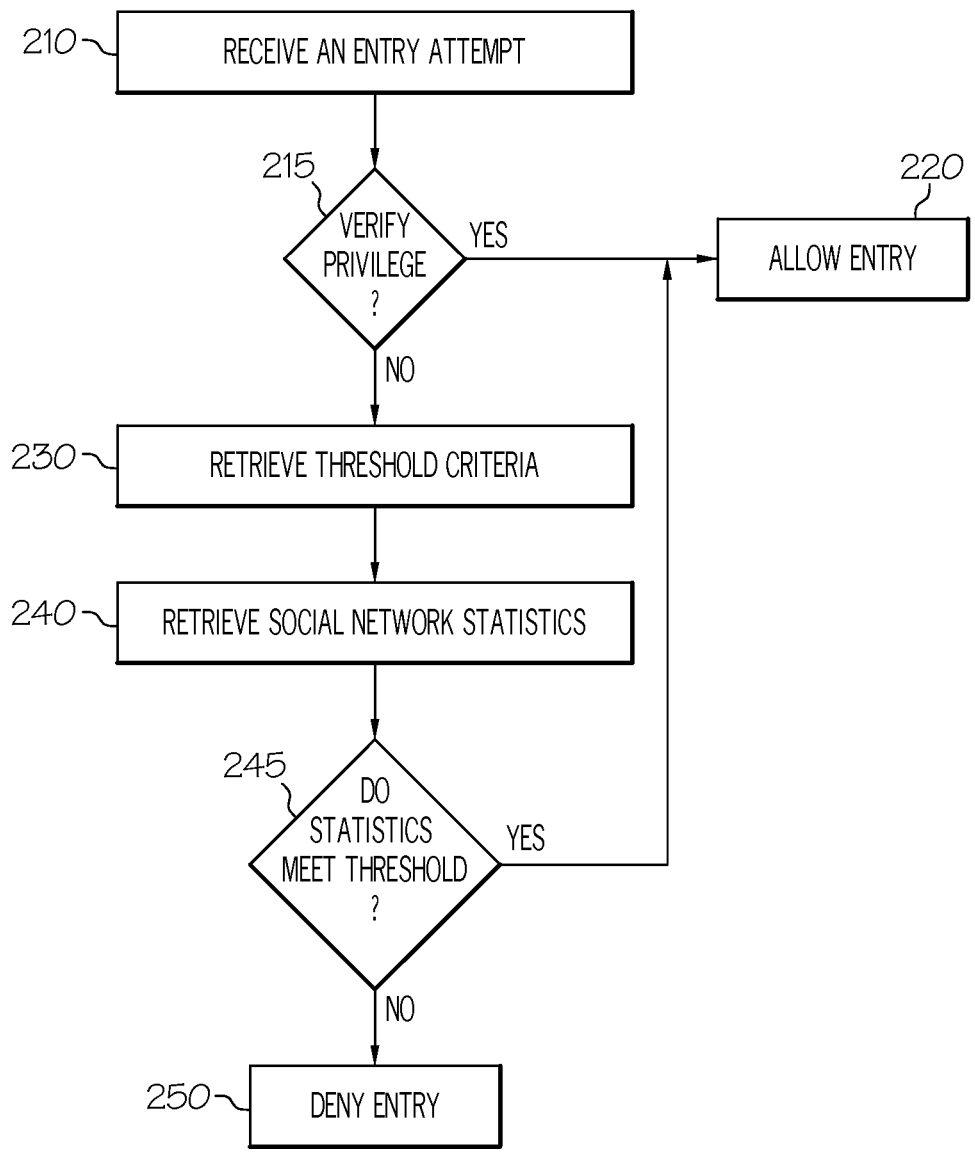
FIG. 2 is a flow diagram of a method for communicating through the internet using social networking thresholds in access control decisions according to an exemplary embodiment of the present invention.

A method for using social networking thresholds in access control decisions is shown in FIG. 2. The program code 142 on server 100 receives an attempted entry into a social network user's content 111 by a second user (step 210). The program code 142 verifies whether or not the second user has the privilege required to access the content 111 (step 215). For example, if the content 111 is associated with the role "friends", the program code 142 searches the content owner's friends list for the identity of the second user. If the second user is listed in the first user's friends list, then entry is allowed (step 220).

If the second user does not have access privilege, then the program code 142 retrieves the threshold criteria 122 (step 230). As described above, the threshold criteria 122 is a statistical threshold based upon social networking statistics, such as number or percentage of users listed as friends by a content owner, who in turn list another user trying to access privileged content as a friend, length of time that the user seeking access has been listed as a friend, specific roles within friends lists such as relative or known personally, or combinations of statistics.

The program code 142 also retrieves social networking statistics 143 (step 240). This may be accomplished, for example, by retrieving the friends list for each user listed as a friend on the content owner's friends list 120, and searching the various friends lists for the desired statistics, as will be described below.

The program code 142 compares the social networking statistics 143 with the threshold criteria 122 to determine whether the social networking statistics meet the threshold criteria (step 245). For example, a threshold criteria 122 requires that at least five users listed as friends on the content owner's friends list 120 list the user attempting to access privileged content 111 as a friend. The program code 142 having previously determined that the user attempting access is not listed on the content owner's friends list 120, retrieves the threshold criteria 122 and determines that at least five users listed on the content owner's friends list must list the user attempting access as friends. The program code 142 then retrieves the friends list of the first user listed on the content owner's friends list and searches for the identity of the user attempting access. The program code 142 continues to pull friends lists for the friends of the content owner and to compile social networking statistics 143 until it determines that the threshold criteria 122 is met or until all of the friends of the content owner have been checked.

If the statistics 143 meet the threshold criteria 122, then the program code 142 allows the user seeking access to access or enter the privileged content 111. Thus, users that are not currently on the content owner's friends list 120 can be granted access to privileged content enabling the content owner to expand his/her social network. Moreover, the content owner can control the expansion of his/her social network to users that meet a threshold criteria 122 that has a high probability of screening out unwanted users (e.g., spammers and trolls). In an exemplary embodiment, the content owner can adjust the threshold criteria 122 to create a personal level of risk and expansion with which he/she is comfortable.

If the statistics 143 do not meet the threshold criteria 122, then the program code 142 does not allow access to the privileged content 111 by the user seeking access. Thus, the privileged content 111 is protected from unwanted access.

The following examples refer to the exemplary friends lists shown in FIG. 3. A content owner "Al" has a content owner's friends list 120 comprising identifications 302 for other users that the content owner "Al" has added to his friends list. In the illustrated example, Al has added Bob, Carl, Dave, Ed and Frank to his friends list. Also, the friends list includes a length of time 304 (or date added) for each friend, and a role or status 306 such as known personally, family, soccer team, etc. for each friend. In the illustrated example, Bob's friends list 310 includes Al, Carl, Dave, Kevin, and Larry. Carl's friends list 320 includes Al, Bob and Dave. Dave's friends list 330 includes Al, Bob, Carl, and Kevin. Ed's friends list 340 includes Al, Bob, Carl and Kevin. Frank's friends list 350 includes Al Ed and Kevin.

Figure 4:
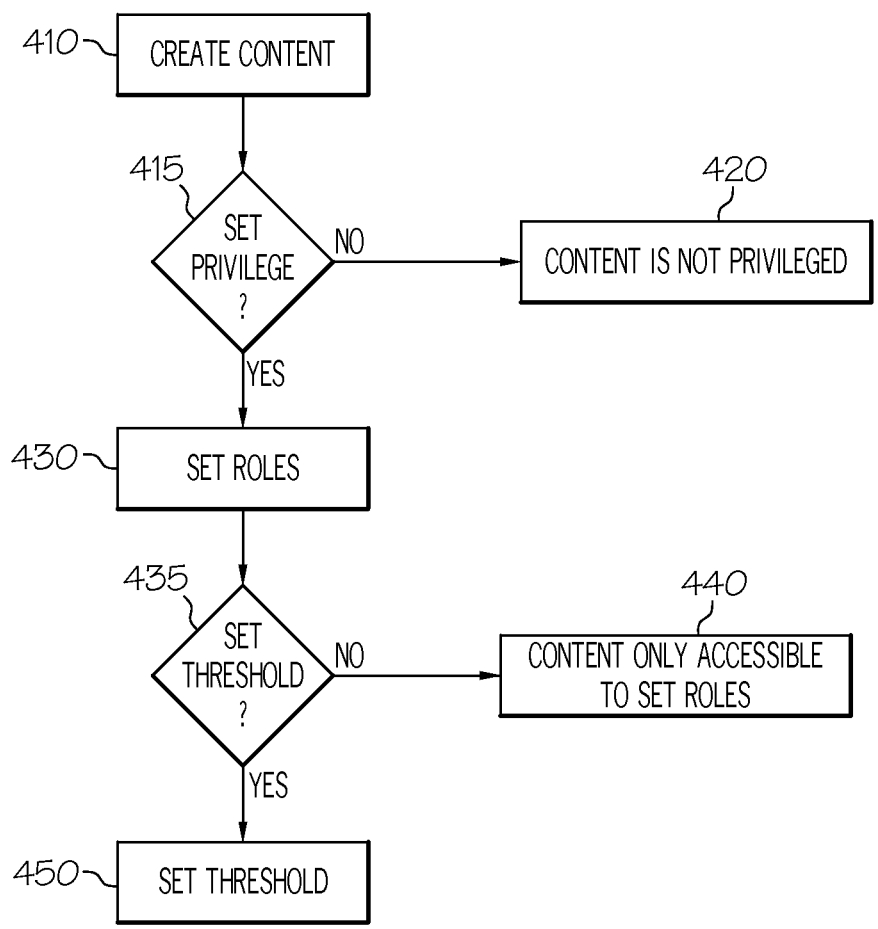
FIG. 4 is a block diagram of a method for implementing a social networking threshold according to another exemplary embodiment of the present invention.

As shown in FIG. 4, a content owner creates content for a social network (step 410). This content may be any combination of information, images, discussion topics, or any other content suitable for posting on a social network. The content owner then decides whether or not to set a privilege to control access to the content (step 415). If the content owner elects not to set a privilege for the content, then the content is not privileged (step 420), and is accessible to all users.

If the content owner elects to set a privilege, a privilege is set (step 430). This may be accomplished by opening a dialog box, accessing a tool from a pull down menu or any other appropriate means. In an exemplary embodiment, program code 142 may prompt the content owner to set privilege for access upon completion of content or upon posting of content. If a privilege is set for the content, then it can only be accessed by a user having the privilege that was set. For example, the privilege may be associated with a role, such as friends (only users listed on the content owner's friends list), family (only users listed as family on the content owner's friends list), known personally (only users listed as known personally on the content owner's friends list, soccer team (only users listed as members of the soccer team on the owner's friends list), and the like.

The content owner may then decide whether or not to set a threshold criteria 122 (step 435). As with setting a privilege, this may be accomplished by opening a dialog box, accessing a tool from a pull down menu or any other appropriate means. In an exemplary embodiment, program code 142 may prompt the content owner to set threshold criteria 122.

For example, in a social network represented by the friends lists of FIG. 3, Al is the content owner. Al sets a threshold of users listed as friends by thee current friends. Thus, access will be extended to users who are not on Al's friends list 120 but are listed on the friends lists of at least three users currently on Al's friends list 120. In the illustrated example, Kevin is not on Al's friends list 120. However, Bob, Dave, Ed and Frank each list Kevin are each on Al's friends list 120 and list Kevin on their respective friends lists 310, 330, 340, 350. Kevin, therefore, will be allowed to access the privileged content, because Kevin meets the threshold criteria of being listed on the friends list of at least three friends on Al's list. Larry, however, is only listed as a friend by Bob and Ed. Thus, since Larry does not meet the threshold criteria 122 of being listed on the friends list of at least three friends on Al's list, Larry will not be allowed access.

In another example, a social network is represented by the friends lists of FIG. 3. Al, who is the content owner, sets a threshold of users known personally by or family members of at least two current friends. Thus, access will be extended to users who are not on Al's friends list 120 but are listed as on the friends lists of at least two users currently on Al's friends list 120 either as known personally by or family of those current friends. Kevin, who is not on Al's friends list 120 is not listed as known personally or family on the friends lists of any users who are listed on Al's friends list. Thus, Kevin does not meet this threshold criteria of being listed as known personally or family by at least two users on Al's friends list 120. Larry, however, is listed as family on Bob's friends list 310 and as known personally on Ed's friends list 340, and both Bob and Ed are listed on Al's friends list 120. Thus, Larry does meet this threshold criteria of being listed as known personally or family by at least two users on Al's friends list 120, and will be allowed access.

In yet another example, a social network is represented by the friends lists of FIG. 3. Al, who is the content owner, sets a threshold of being listed as a friend by at least three current friends for a period of at least five days. Thus, access will be extended to users who are not on Al's friends list 120 but have been listed as friends on the friends lists of at least three users currently on Al's friends list 120 for at least five days. Neither Kevin nor Larry have been listed as friends by three current friends from Al's list for at least five days. Thus, neither will be allowed access.

In yet another example, a social network is represented by the friends lists of FIG. 3. Al, who is the content owner, sets a threshold of being listed as a friend by at least forty percent of current friends for a period of at least three days or being listed as known personally or family by at least two current friends. Thus, access will be extended to users who are not on Al's friends list 120 but have been listed as friends on the friends lists of at least forty percent of users currently on Al's friends list 120 for at least three days, and access will be extended to users who are not on Al's friends list 120 but are listed as on the friends lists of at least two users currently on Al's friends list 120 either as known personally by or family of those current friends. Kevin who is listed on Bob's and Ed's friends lists 310, 340 for at least three days (three and five, respectively, and two of five equals forty percent) meets the first test of the threshold criteria, and Larry who is listed as family on Bob's friends list 310 and as known personally on Ed's friends list 340 meets the second test of the threshold criteria.

In another exemplary embodiment, a user may set a threshold for statistics that the user wants to exclude. For example a new user that has been added to a large percentage of the network may be a spammer. Thus, the user sets a threshold of not having joined the social the network less than one month ago and being listed in the friends lists of over sixty percent of the network.

The foregoing examples are just a few of the possible threshold criteria that are possible. It should be understood that any combination of statistics may be used and that alternative or cumulative statistics may be used to form the threshold criteria.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable storage medium providing program code for use by or in connection with a computer or any instruction execution system or device. For the purposes of this description, a computer-usable or computer readable storage medium may be any apparatus that can contain, store, communicate, or transport the program for use by or in connection with the instruction execution system, apparatus, or device.

The foregoing method may be realized by a program product comprising a machine-readable storage media having a machine-executable program of instructions, which when executed by a machine, such as a computer, performs the steps of the method. This program product may be stored on any of a variety of known machine-readable storage media, including but not limited to compact discs, floppy discs, USB memory devices, and the like.

The medium can be electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, or an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method for controlling access to privileged content of a first user by a second user in a computer-based social networking environment, comprising the steps of:
    verifying whether or not a second user has an appropriate privilege for accessing the privileged content;
    retrieving a threshold criteria for access control in response to an attempted access by a second user without an appropriate privilege;
    retrieving social network statistics;
    comparing the statistics to the threshold criteria; and
    allowing the second user access to the privileged content if the statistics meet the threshold criteria, wherein the threshold criteria comprises said second user being listed on a friends list by a predetermined number of users listed as friends by said first user for a predetermined period of time.

2. The method of claim 1, wherein the threshold criteria comprises said second user being listed with a special status by a predetermined number of users listed as friends by said first user.

3. The method of claim 1, wherein the threshold criteria comprises said second user being listed on a friends list by a predetermined number of users listed as friends by said first user.

4. The method of claim 1, wherein the threshold criteria comprises said second user being listed on a friends list by a predetermined percentage of users listed as friends by said first user.

5. The method of claim 1, wherein the social network statistics comprise at least one of:
    number of users listed as friends for said first user who list said second user as a friend, length of time that users listed as friends for said first user have listed said second user as a friend, percentage of users listed as friends for said first user who list said second user as a friend, and groups of which said second user is a member.

6. The method of claim 1, wherein the social network statistics comprise at least two alternative statistics.

7. The method of claim 1, wherein meeting the threshold comprises not having specific combinations of statistics.

8. The method of claim 1, wherein meeting the threshold comprises having specific combinations of statistics.

9. The method of claim 1, wherein the threshold criteria comprises said second user being listed on a friends list by a predetermined percentage of users listed as friends by said first user for a predetermined period of time.

10. A method for controlling access to privileged content of a first user by a second user in a computer-based social networking environment, comprising the steps of:
    verifying whether or not a second user has an appropriate privilege for accessing the privileged content;
    retrieving a threshold criteria for access control in response to an attempted access by a second user without an appropriate privilege;
    retrieving social network statistics;
    comparing the statistics to the threshold criteria; and
    allowing the second user access to the privileged content if the statistics meet the threshold criteria, wherein the threshold criteria comprises said second user being listed on a friends list by a predetermined percentage of users listed as friends by said first user for a predetermined period of time.

11. The method of claim 10, wherein the threshold criteria comprises said second user being listed with a special status by a predetermined number of users listed as friends by said first user.

12. The method of claim 10, wherein the threshold criteria comprises said second user being listed on a friends list by a predetermined number of users listed as friends by said first user.

13. The method of claim 10, wherein the threshold criteria comprises said second user being listed on a friends list by a predetermined percentage of users listed as friends by said first user.

14. The method of claim 10, wherein the threshold criteria comprises said second user being listed on a friends list by a predetermined number of users listed as friends by said first user for a predetermined period of time.

15. The method of claim 10, wherein the social network statistics comprise at least one of:
    number of users listed as friends for said first user who list said second user as a friend, length of time that users listed as friends for said first user have listed said second user as a friend, percentage of users listed as friends for said first user who list said second user as a friend, and groups of which said second user is a member.

16. The method of claim 10, wherein the social network statistics comprise at least two alternative statistics.

17. The method of claim 10, wherein meeting the threshold comprises not having specific combinations of statistics.

18. The method of claim 10, wherein meeting the threshold comprises having specific combinations of statistics.

* * * * *